United States Patent [19]
Montague

[11] Patent Number: 5,562,270
[45] Date of Patent: Oct. 8, 1996

[54] WRIST PAD

[76] Inventor: Dale Montague, 207 Frankfort Ave., Huntington Beach, Calif. 92648

[21] Appl. No.: 177,854

[22] Filed: Jan. 5, 1994

Related U.S. Application Data

[63] Continuation-in-part of Ser. No. 955,315, Oct. 1, 1992, abandoned, which is a continuation-in-part of Ser. No. 871,534, Apr. 20, 1992, abandoned.

[51] Int. Cl.$^6$ .............................. A47B 91/00; B68G 5/00
[52] U.S. Cl. .................. 248/118.1; 248/918; 248/346.01
[58] Field of Search ................................. 248/118.1, 118, 248/118.3, 118.5, 918, 346, 345.1; 132/73, 73.5; 400/715; 273/148 B; 482/49

[56] References Cited

U.S. PATENT DOCUMENTS

| | | | |
|---|---|---|---|
| 105,001 | 7/1870 | Sanborn | 248/118.5 |
| 4,621,781 | 11/1986 | Springer | 248/118 |
| 4,840,370 | 6/1989 | Biddlecombe | 5/646 X |
| 4,973,176 | 11/1990 | Dietrich | 400/715 |
| 5,125,606 | 6/1992 | Cassano et al. | 400/715 X |
| 5,131,614 | 7/1992 | Garcia et al. | 248/118 |
| 5,158,255 | 10/1992 | Fuller | 248/118 |
| 5,158,257 | 10/1992 | Wilson | 248/918 X |
| 5,163,646 | 11/1992 | Engelhardt | 400/715 X |
| 5,170,971 | 12/1992 | Schaffer et al. | 248/345.1 X |
| 5,183,230 | 2/1993 | Walker et al. | 248/346 |
| 5,203,845 | 4/1993 | Moore | 248/918 X |
| 5,208,084 | 5/1993 | Rutz | 248/345.1 X |
| 5,234,186 | 8/1993 | Powell | 400/715 X |
| 5,340,075 | 8/1994 | Schriner | 248/118 X |

Primary Examiner—Karen J. Chotkowski
Attorney, Agent, or Firm—Dennis W. Beech

[57] ABSTRACT

A device which uses a wrist rest in combination with a computer mouse pad to provide a non-fatiguing environment for manipulation of a computer mouse to control the cursor on a computer display. The wrist rest is designed to place the wrist of the hand manipulating the mouse at a level to provide maximum comfort. The height allows movement of the mouse without a continuous upward bend of the wrist and with movement of the hand that does not cause tension in the arm, neck and shoulder muscles. The wrist rest is also configured in a keyboard/keypad version such that the hand is elevated relative to the keys to be actuated thus relieving tension. The wrist rest and pad are made of a suitable material that does not breakdown under pressure of continuous use yet provides fluid-like pressure distribution for the wrist. The wrist rest and pad may also be used with a protective cover. The wrist rest may have removable cushions which are suitable for use in exercises and the base can have a recession for holding an exercise instruction card which aids in preventing injuries such as carpal tunnel syndrome caused by repetitive motion work.

15 Claims, 10 Drawing Sheets

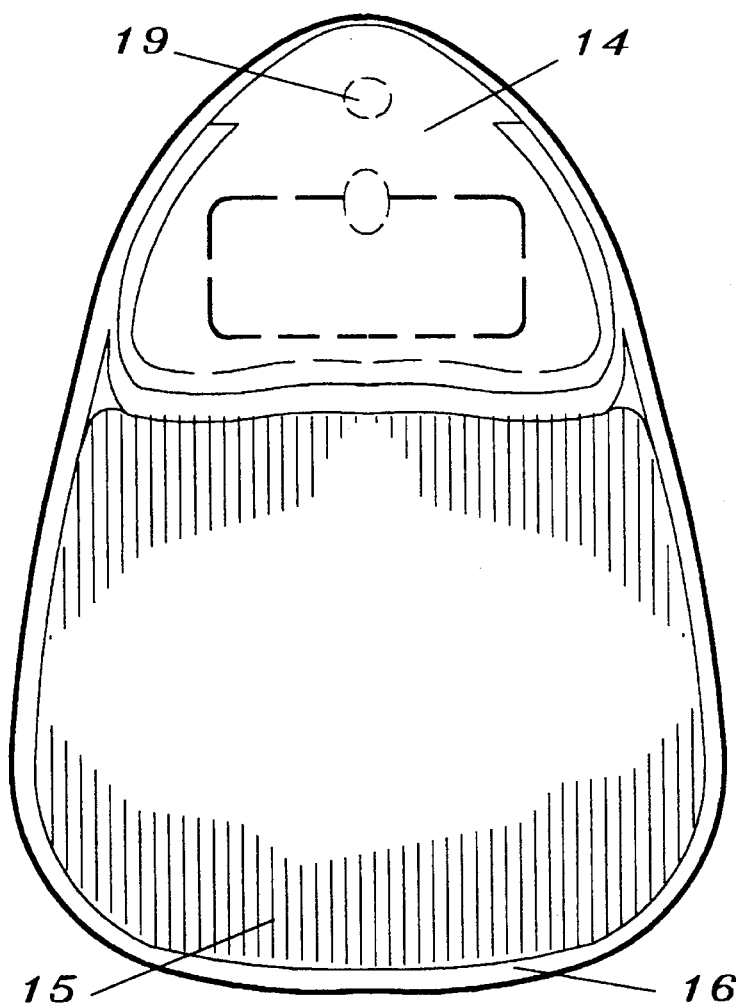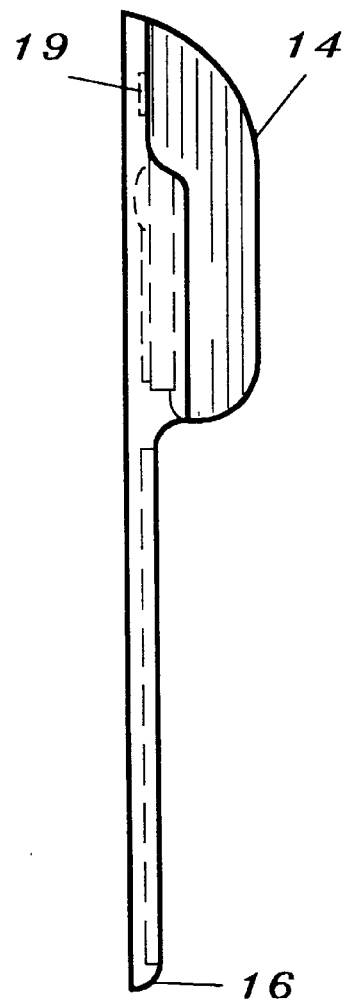
FIG. 4  FIG. 5
FIG. 6

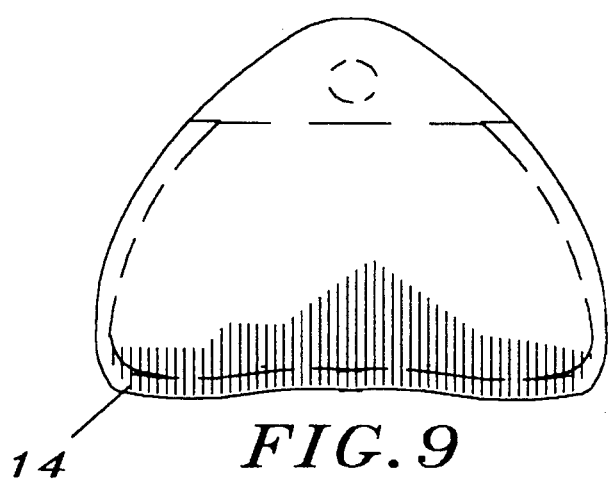
FIG. 9
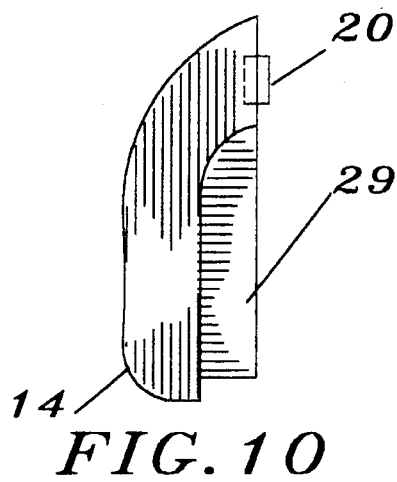
FIG. 10
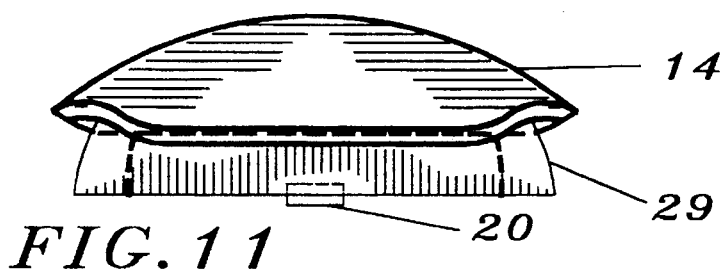
FIG. 11
FIG. 12
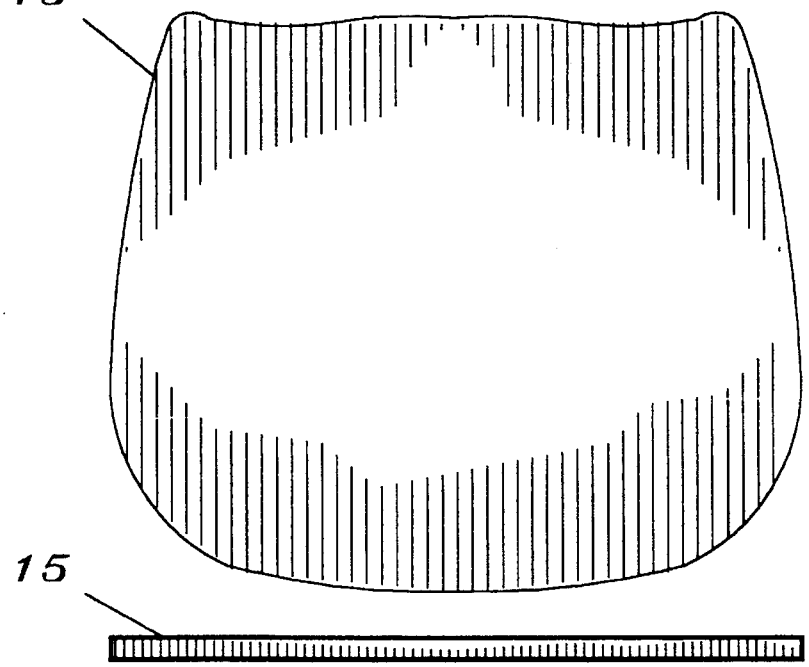
FIG. 13

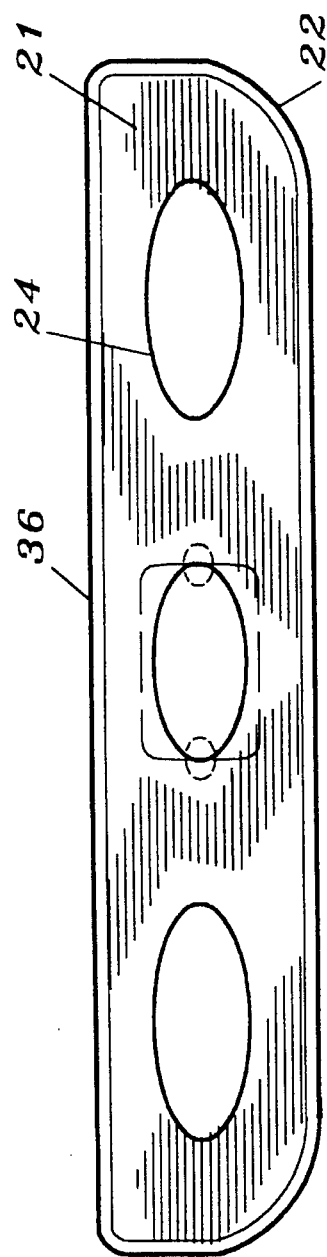
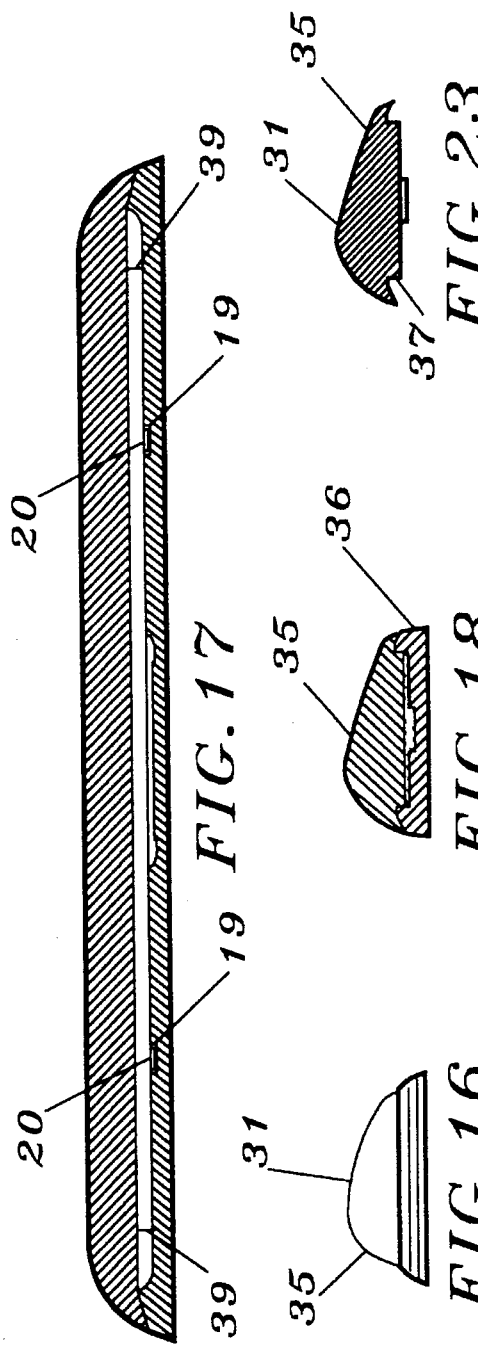

WRIST PAD

This is a continuation-in-part of application Ser. No. 07/955,315 filed Oct. 1, 1992 and now abandoned, which is a continuation-in-part of parent application Ser. No. 07/871,534 filed Apr. 20, 1992 and now abandoned.

BACKGROUND OF THE INVENTION

1. Field of Invention.

This invention relates to devices used with computer input devices for control of the cursor on a display and with keyboards. The mobile manual input device to control the cursor usually has a ball and tracking mechanism to be moved on a surface or pad and is commonly known as a mouse. Pointing/tracking ball devices are also used to control the cursor. Keyboards and keypads are used to enter data and commands into the computer system.

2. Description of Prior Art.

There are currently in use very simple flat pads as the preferred surface on which to move the computer cursor display control device commonly known as a mouse. These pads are usually rectangular, approximately ¼ inches thick, and made of rubber or other similar material with a textured surface. The pad provides a better friction surface for the movement of the ball in the mouse to avoid any slipping such as can occur on a hard smooth surface such as a table top or desk top.

In addition to the flat pad on which to move a mouse there are specially designed pads and rests to be used with the mouse to relieve tension to the wrist. Specially design pads tend to be straight extensions of the flat pad without special provisions to prevent fatigue of the arm and shoulder during lengthy use or to prevent the build up of pressure points on the wrist or hand. The wrist rests currently in use are foam pads that work in conjunction with the mouse and must be moved around in proximity to the mouse as it is moved on the pad.

The keyboard/keypad data and command entry devices of a computer system generally are not used with any supporting surface for the hand or wrist. However, some straightforward pads which can be placed along the bottom edge of the keyboard/keypad are in use. These tend to provide a rest for the heal of the hand and are of a flat shape for such a purpose. These devices are not generally elevated such that one can rest the wrist at the proper height while using the fingers of the hand to actuate the keyboard/keypad keys.

The present invention to be used with a computer mouse combines the friction surface pad with a shaped soft rest pedestal for the wrist of the person using the pad to move the mouse and to control the display cursor. For the keyboard/keypad the wrist pad has an elevation with respect to the keys and a curvature such that the weight of the arms and hands can be comfortably rested on the pad and the keys easily actuated by the fingers. Such pads may also be used with pointing/tracking ball devices. These combinations provide for less fatigue in the muscles of the arm, shoulder, and neck and help reduce the risk of carpal tunnel syndrome or other repetitive motion disorders. It also prevents the build up of pressure points on the wrist or hand when a mouse, pointing/tracking ball device or keyboard/keypad is used for an extended period of time. In addition the base of the pad may contain a recess for holding an exercise instruction card for use in preventing fatigue when using the mouse or keyboard including using the cushion as an exercise device.

SUMMARY OF THE INVENTION

A primary objective of the present invention is to provide a wrist rest for use with a computer mouse pad, pointing/tracking ball and keyboard/keypad to prevent fatigue. By providing a comfortable wrist rest, the muscles in the arm, neck and shoulder do not require constant tension to manipulate the mouse or actuate the keys and therefore cause fatigue as the mouse, pointing/tracking ball or keyboard/keypad is used for long periods of time. With the wrist rest, the wrist and hand are in a more natural position or anatomically neutral point for moving a computer mouse, pointing/tracking ball or actuating keyboard keys than when the arm and wrist are flat on the table and the wrist must always be bent up to a certain degree. Another object is to provide a cushion that is removable and usable as an exercise device.

A further object of the invention is to provide a pad and pedestal shape for use with a computer mouse that prevents the palm from rubbing the sides causing any pressure points to build up. Another object of the invention is to provide a shaped pad to facilitate easier motion and ease of locating the center. An additional objective is to provide an integrated pad and pedestal such that the mouse pad does not move relative to the pedestal when the mouse is used. A further object is to provide a pad for use with pointing/tracking devices.

A further object of the keyboard/keypad wrist rest is to provide a rest that prevents the heal of the hand from constant rubbing on a flat surface thus causing the build up of pressure points.

An additional object of the rests is to provide a means for preventative exercise to prevent repetitive motion disorders such as forearm/wrist tendinitis, overuse syndrome and to prevent fatigue due to a lack of proper blood flow and circulation.

Another object of the invention is to provide a convenient storage aperture for the storage of an exercise card with instructions for use of various exercises including using the cushions for exercise.

In accordance with the description presented herein, other objects of this invention will become apparent when the description and drawings are reviewed.

BRIEF DESCRIPTION OF THE DRAWING

FIG. 4 illustrates a top view of the wrist pad with removable pedestal and pad elements for use with a mouse.

FIG. 5 illustrates a side view of the wrist pad with removable pedestal and pad elements for use with a mouse.

FIG. 6 illustrates an end view of the wrist pad with removable pedestal and pad elements for use with a mouse viewed from the pad end looking toward the pedestal.

FIG. 9 illustrates a top view of the pedestal cushion.

FIG. 10 illustrates a side view of the pedestal cushion.

FIG. 11 illustrates an end view of the pedestal cushion.

FIG. 12 illustrates a top view of the pad cushion.

FIG. 13 illustrates an end view of the pad cushion.

FIG. 14 illustrates a top view of a keyboard pad with removable cushion.

FIG. 15 illustrates a front view of a keyboard pad.

FIG. 16 illustrates an end view of a keyboard pad.

FIG. 17 illustrates a sectional view of a keyboard pad without pedestals at the highpoint.

FIG. 18 illustrates a sectional view viewed from the end of a keyboard pad.

FIG. 23 illustrates an end view of the keyboard cushion.

DESCRIPTION OF THE PREFERRED EMBODIMENT

Figure 26:
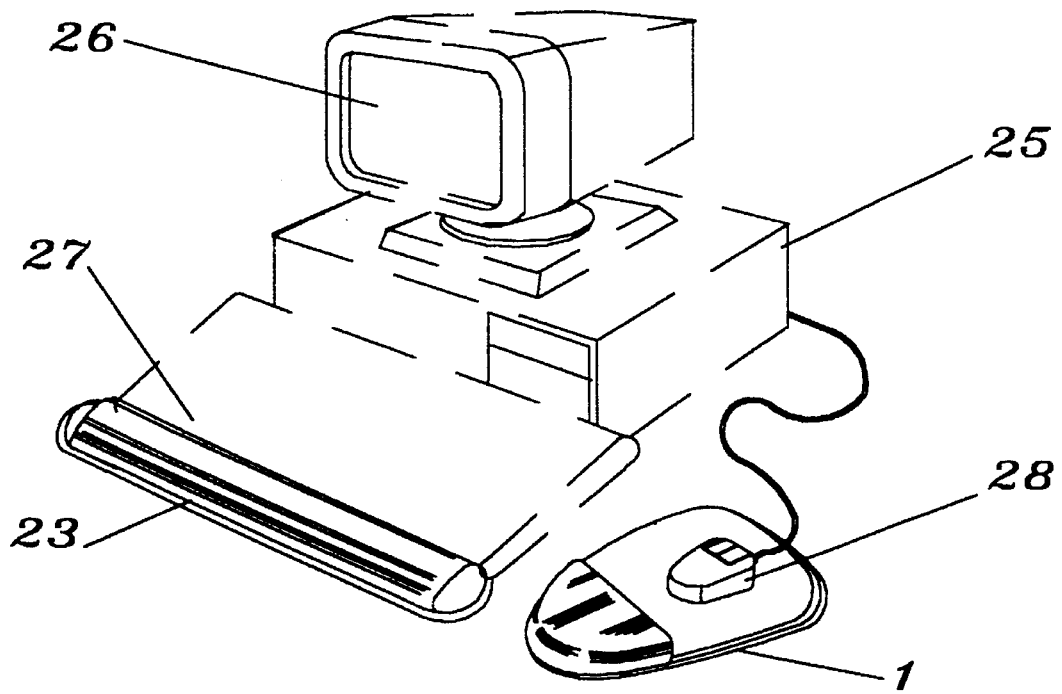
FIG. 26 illustrates the use of a wrist pad and keyboard pad with a computer system.
Figure 27:
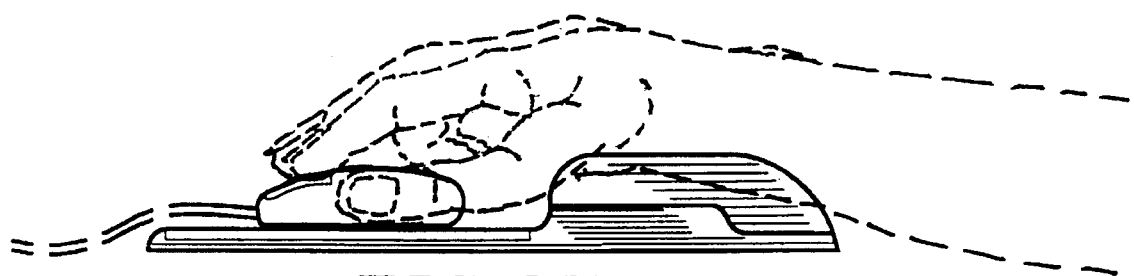
FIG. 27 illustrates a side view of the wrist and hand location when resting on the wrist pad pedestal.
Figure 28:
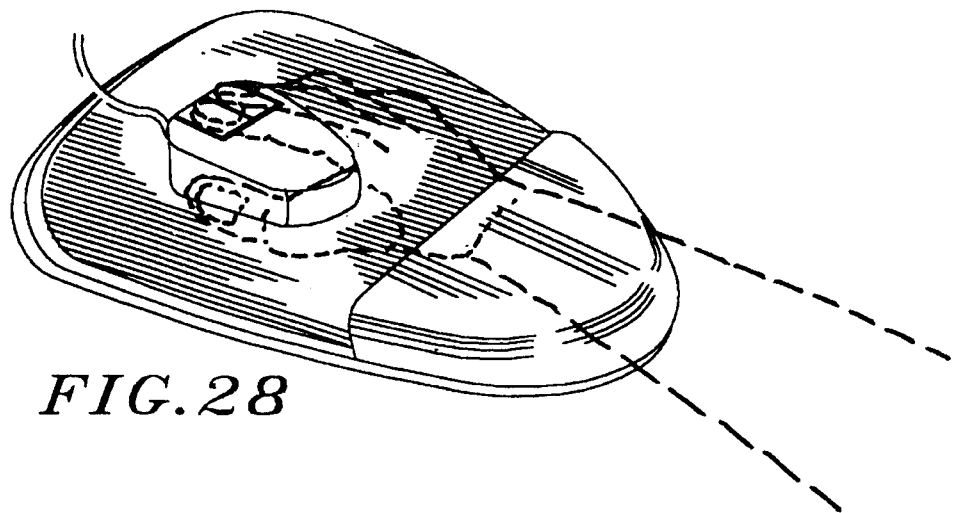
FIG. 28 illustrates a perspective view of the wrist and hand location when resting on the wrist pad pedestal.

The wrist pad consists of a surface on which to mechanically, by hand, move a computer mouse (28) to control the position of a cursor on the computer display (26) via a computer (25) in combination with a pedestal on which to rest the wrist. Such use is illustrated in FIG. 26. The wrist rest or pedestal may be separate from the pad, the combination of the two may be formed from one material, or the two may be joined by some other means. The pad has a surface of suitable size to control the cursor on the entire screen where the amount of movement of the computer mouse necessary to move the cursor over the entire area of the screen is defined by the particular computer system being used. The pad surface may be arched to provide ease of location of the center. The pedestal is shaped and tapered to allow ease of movement of the hand when the wrist is rested on the pedestal and to avoid unnecessary rubbing of the palm on the sides as illustrated in FIG. 27 and FIG. 28.

Figure 1:
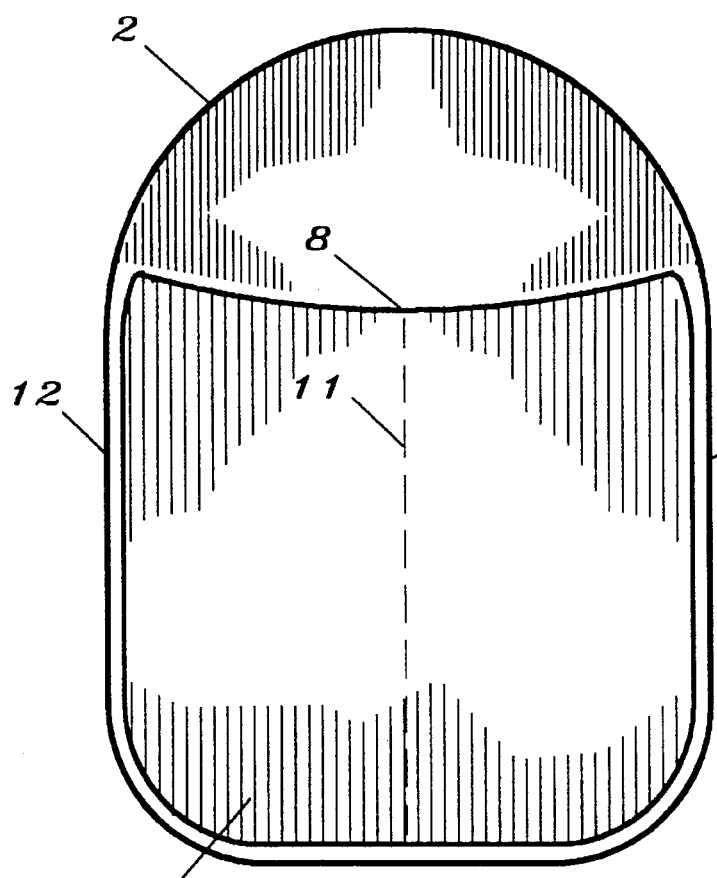
FIG. 1 illustrates a top view of the wrist pad for use with a mouse.
Figure 2:
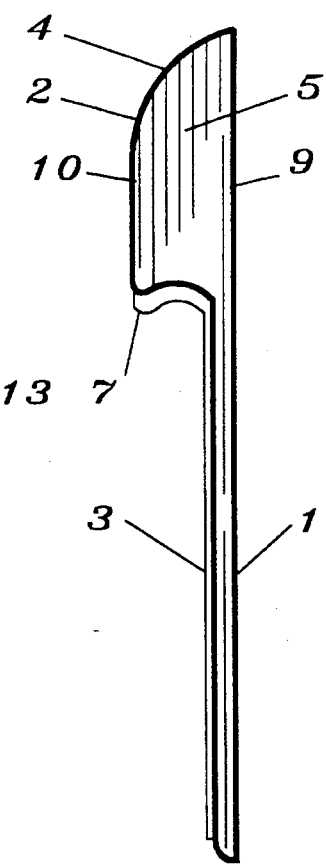
FIG. 2 illustrates a side view of the wrist pad for use with a mouse.
Figure 3:
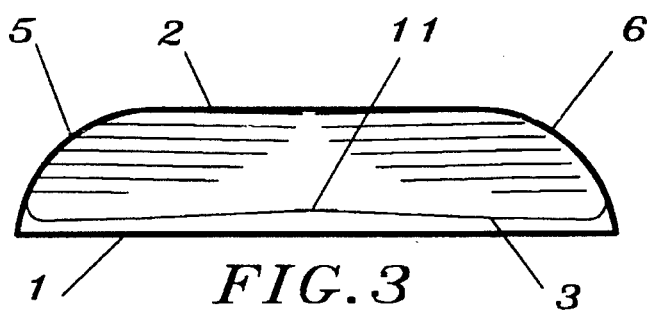
FIG. 3 illustrates an end view of the wrist pad viewed from the pad end looking toward the pedestal.
Figures 7, 8:
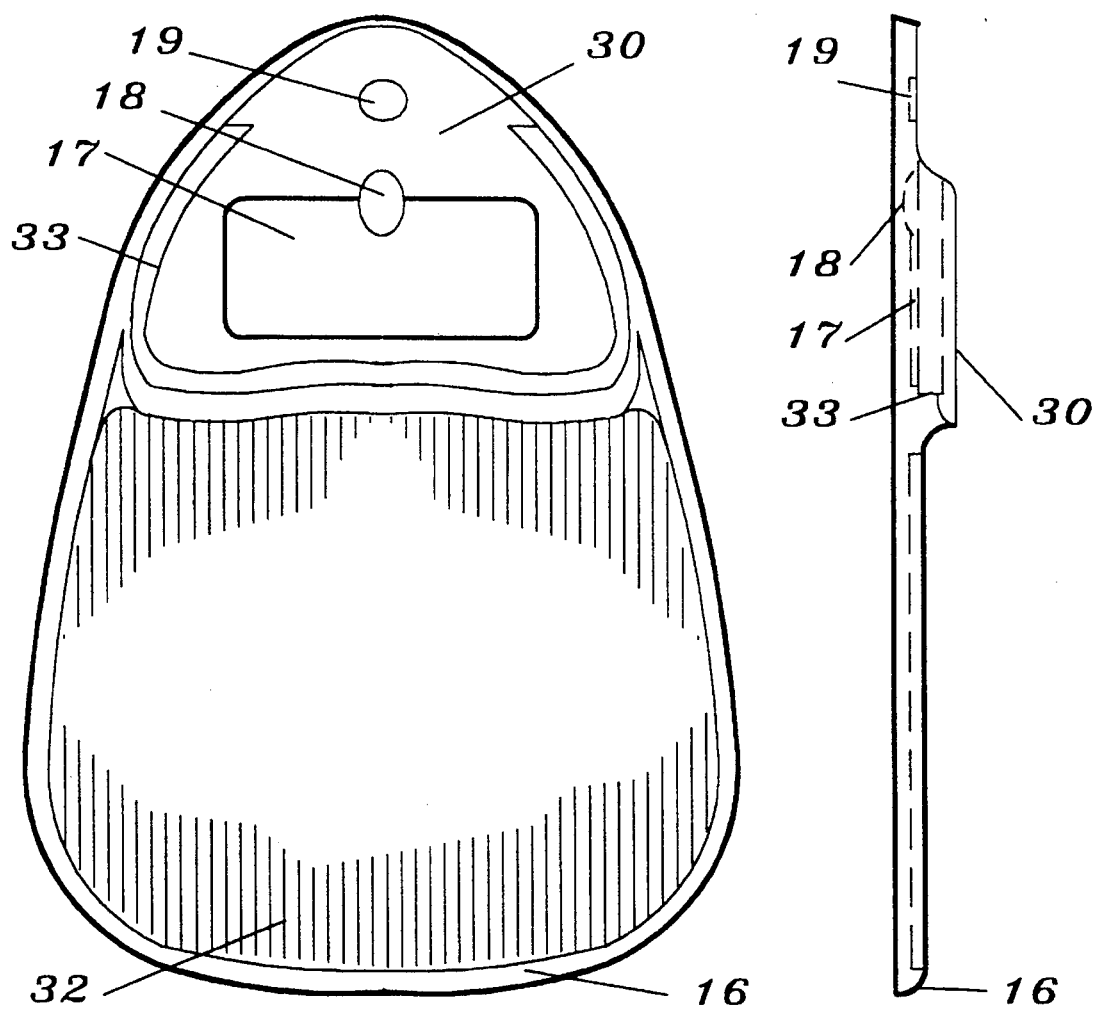
FIG. 7 illustrates a top view of the wrist pad with the pedestal cushion and pad cushion removed.
FIG. 8 illustrates a side view of the wrist pad with the pedestal cushion and pad cushion removed.

Referring to FIGS. 1 through 3, a pad (1) and pedestal (2) combination are formed from a suitable soft yet firm material such as any of various commercially available synthetic rubbers, urethane and neoprene covered with LYCRA or nylon. LYCRA or nylon provides a friction surface (3) for the pad (1) which allows control of a computer mouse to prevent slipping while urethane provides a comfortable resting pedestal (2) for the wrist of the person using the wrist pad. A urethane that is firm enough to support the wrist, but won't break down under pressure and is fluid-like to provide pressure distribution for the wrist rest is the most suitable. Also a urethane with a delayed recovery time provides the best performance in allowing adequate hand motion without pressure point build up.

The pedestal (2) is curved in a downward slope of the pedestal back (4) and pedestals right side (5) and left side (6) to provide comfort and ease of movement of the hand and wrist as the computer mouse is moved around on the pad (1). The pedestal front (7) is arched as indicated in FIG. 1 such that the front (7) curves toward the back (4) as the right side (5) and left side (6) are approached from the center (8). This shape provides clearance for the hand and palm to move the mouse around on the pad (1) without having to lift the wrist. A pedestal (2) thickness from bottom (9) to top (10) of one to one and one-half inches has been found to be the best height.

The pad (1) is of generally a rectangular shape with enough surface (3) area to allow movement of the cursor over the entire range of the computer display as defined by the particular computer in use by movement of the mouse on the pad (1). A pad (1) of eight inches by nine and one-half inches in size has been found to be adequate for most standard computer displays. The pad (1) may be thicker along its center line (11) than at the right edge (12) and left edge (13). This thickness provides a simple way for the user to determine the center of the pad (1) in order to easily return the mouse to the center of the pad.

The wrist pad may be used with a suitable cover which can be easily installed and removed to allow for cleaning if the device should become soiled or dirty over continuous use. Any suitably nonabrasive, flexible cover material such as commonly found LYCRA materials may be used. It has been found best to use a cover shaped to the wrist pad at all surfaces with an opening having an elastic band that when installed on the wrist pad the opening is under the bottom (9) of the wrist pad. Various colors of materials may be used for esthetic purposes.

The single unit wrist pad is the simplest version of the invention with regards to the use with a computer mouse (28). A more versatile version is illustrated in FIGS. 4 through 13 wherein the pedestal cushion (14) and pad cushion (15) elements may be removed from the wrist pad base (16) for replacement or for use in exercising. The pedestal cushion (14) is made of a urethane material that is suitable for being squeezed by a person's hand providing a means to exercise relative to the tedium of using the mouse for long periods. A slow recovery urethane composition has been found to be good for support of the wrist and soft enough to give ease of exercise such as when squeezing a sponge. The pad cushion (15) is made of neoprene covered with LYCRA or nylon and the wrist pad base (16) normally would be of a more dense urethane or hard plastic.

Experiments were conducted to determine the proper compression/recovery characteristics for the pedestal cushion (14) and other cushion material for preventative exercise. Indentation Load Deflection (ILD) is the measurement of the load necessary to produce a 25% or other indentation in a urethane foam product. This is done using an indentor foot on a compression machine. It is expressed in foot/pounds. A method of measurements is to setup two chatillion compression gages with 1" indentor feet to perform this measurement on each piece of the mouse pad, and the short & long keyboard pads. The indentor is set so that the pads will slide freely under the foot with the dials set at zero. The pads are compressed down to 75% of the thickness of the pads. The reading on the machine will indicate the hardness of the pads in foot/pounds. Once it is determined what the hardness requirements are for exercise, the compression gages can be set with high & low parameters on the indicating dial. By experiment for this invention the parameters were found to be between 1.5 and 4.0 foot/lbs.

Figure 34:
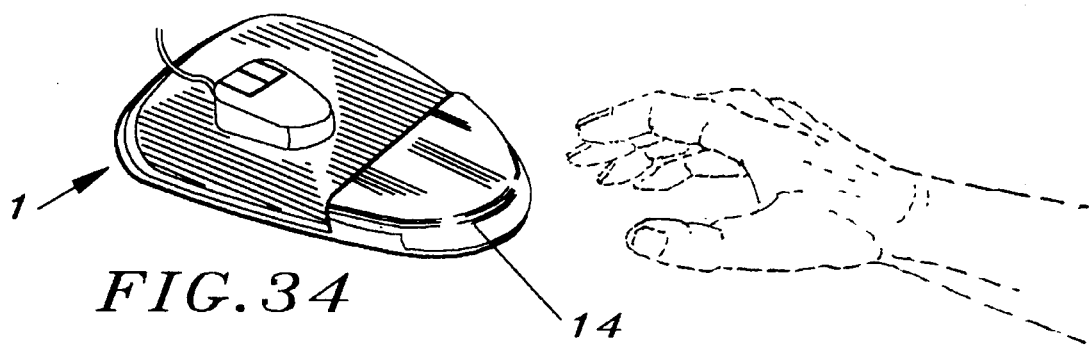
FIG. 34 illustrates a perspective view of wrist pad.
Figure 35:
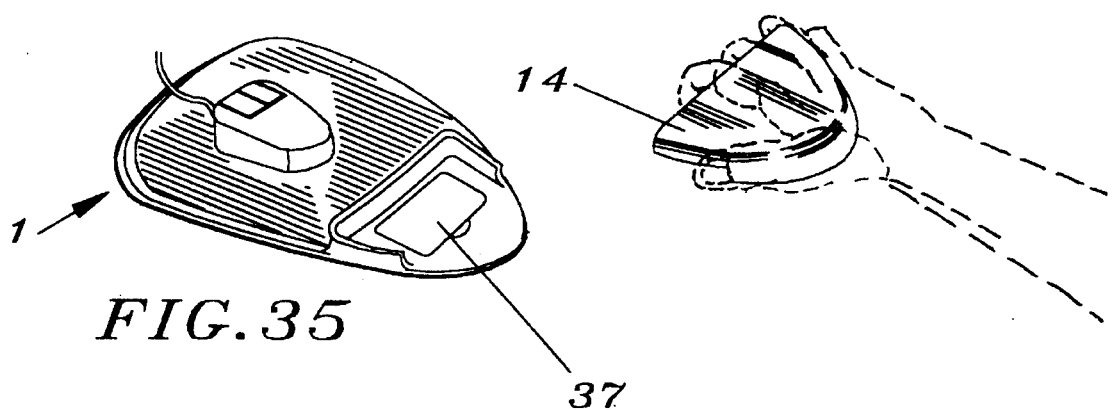
FIG. 35 illustrates a wrist pad with the pedestal cushion removed and the exercise card revealed.
Figure 36:
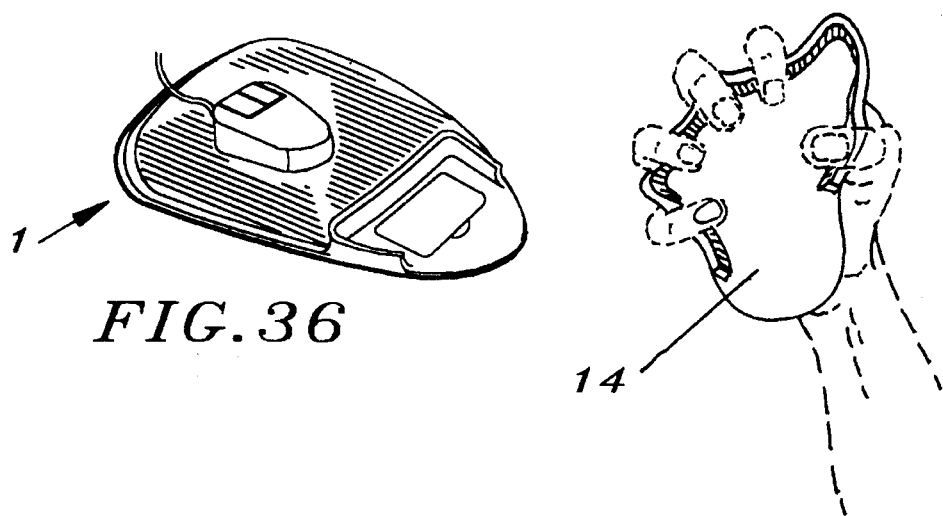
FIG. 36 illustrates a pedestal cushion being used for preventative exercise.

The wrist pad base (16) is designed with a receptacle aperture (17) and finger access (18) for storage of an instruction card or exercise card (37) as shown in FIG. (35) regarding use and maintenance of the wrist pad including the exercise feature. The wrist pad base (16) has a pad retainer (19) which holds the retainer (20) of the pedestal cushion (14) to retain the cushion in the wrist pad base (16). The pad retainer (19) and retainer (20) can normally be matching pieces of VELCRO. The pedestal cushion insert (29) has a 2% slant as shown in FIG. 10 which fits the matching 2% slant or draft around the edge (33) of the wrist pad base (16) pedestal cushion recess (30) to further help retain the cushion. The wrist pad base (16) has a pad cushion recess (32) in which the pad cushion (15) is retained. Removal and use of the pedestal cushion (14) for exercise is illustrated in FIGS. 34 through 36.

Figure 30:
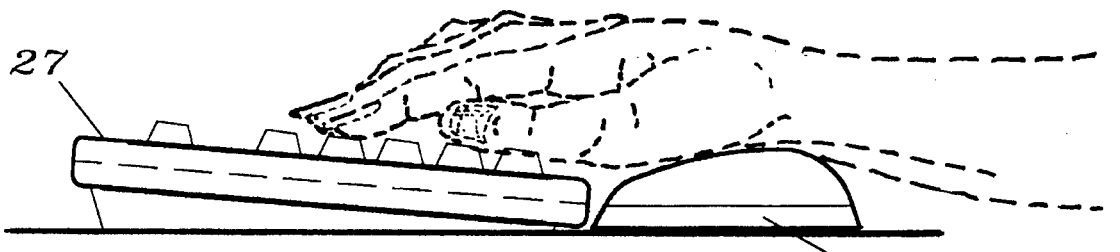
FIG. 30 illustrates a side view of the wrist and hand location when resting on the keyboard pad.

Another variation of the wrist pad used in conjunction with computer keyboards/keypads is illustrated in FIGS. 14 through 25. In the keyboard version of the wrist pad, the device is an elongated, generally rectangular shape to be placed at the base of a keyboard for a computer system. In the illustrated version, the keyboard cushion (21) may be detached and removed from the keyboard pad base (22) wherein there is a keyboard cushion recess (34). The keyboard pad (23) may be designed as an integral unit or have the removable feature. The keyboard pad (23) may have pad pedestals (24) for a pivot point support under a person's hand as illustrated in FIGS. 14 and 15 or it may have a straight longitudinal surface as illustrated in FIG. 17. The keyboard cushion (21) has a taper or slope down from a highpoint (31) located furthest from the keyboard on its upper surface (35) side as illustrated in FIGS. 16 and 18 to provide the proper shape to rest the wrist as illustrated in FIG. 30. A good position for the highpoint (31) for the normal human hand is 2.75 inches plus or minus 0.50 inches from the front side (36) which would be next to the keyboard. Whichever version is used, there is always a convex curvature along the lateral dimension as illustrated in FIG. 16 and FIG. 30 to provide the proper shape for support of the hand and wrist.

Figure 32:
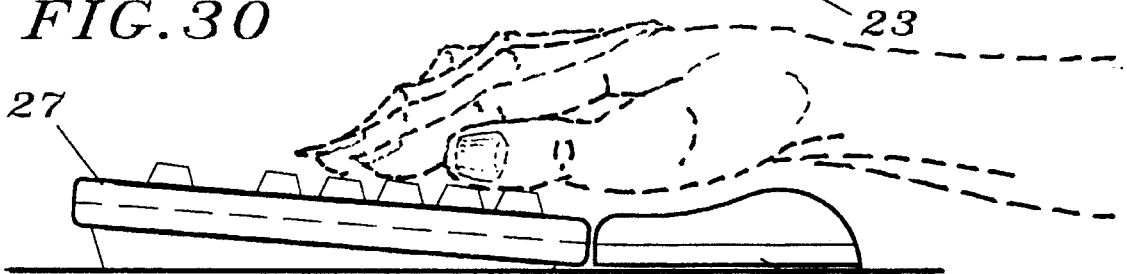
FIG. 32 illustrates a side view of the keyboard pad with the wrist and hand partially raised.
Figure 33:
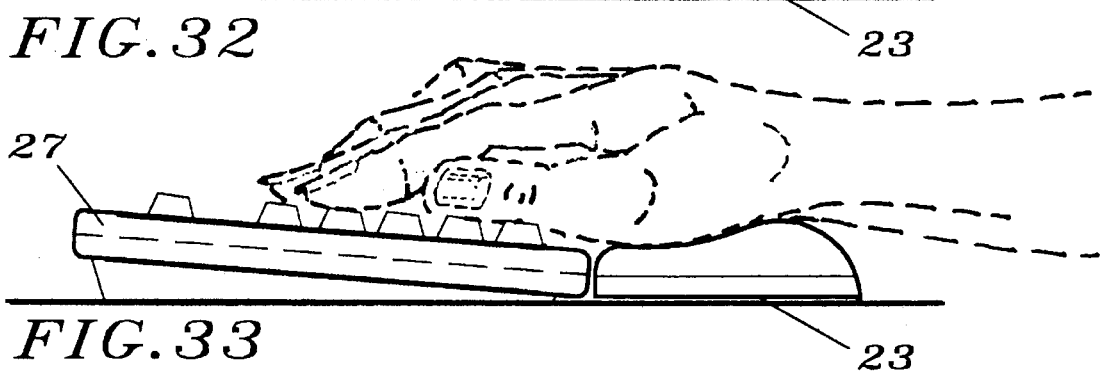
FIG. 33 illustrates a side view of the wrist and hand location when resting on the contoured keyboard pad.
Figure 31:
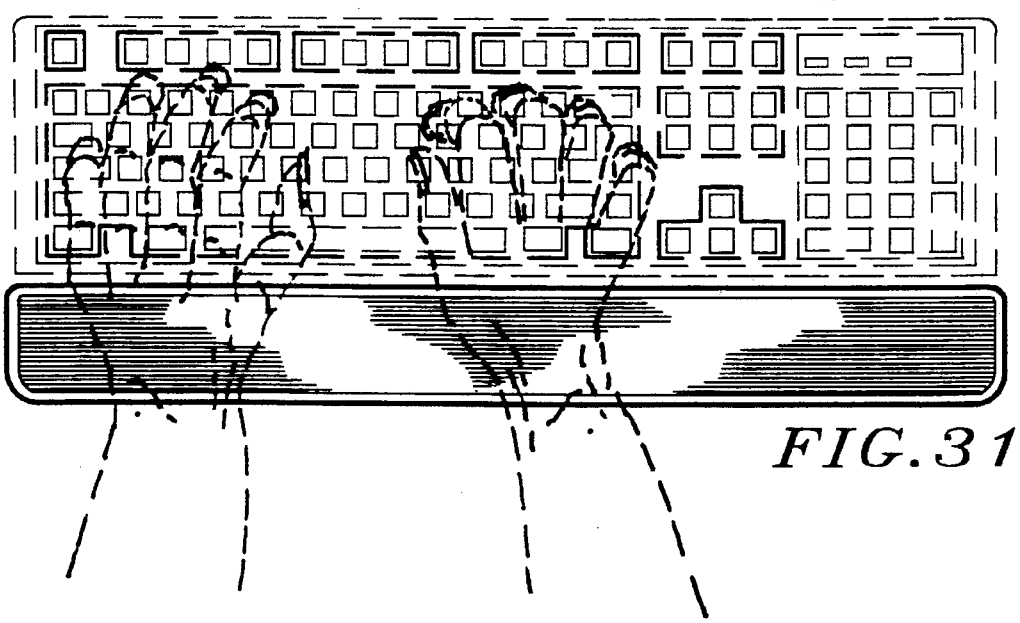
FIG. 31 illustrates a top view of the wrist and hand location when resting on the keyboard pad.

A further refinement of this overall convex shape with highpoint (31) is illustrated in FIGS. 32 and 33. In this embodiment the upper surface (35) between the highpoint (31) and the front side (36) has a concave indentation such that the heal of the hand may rest therein which allows the persons wrist to rest more directly on the highpoint (31)and serve as both a wrist and palm support.

The keyboard cushion (21) may have a keyboard cushion insert (37) which mounts in the keyboard cushion recess (34) such that the keyboard cushion (21) and the keyboard pad base (22) are flush at the front side (36) as illustrated in FIG. 16. The keyboard cushion insert (37) may have a keyboard cushion lock (39) which mates with a keyboard pad base lock (38) when mounted in the keyboard pad base (22).

The keyboard pad (23) may have a pad retainer (19) and a receptacle aperture (17) with finger access (18) similar to that for the wrist pad. The removable keyboard cushion (21) may be squeezed for purposes of exercising as was pointed out with the pedestal cushion (14). The keyboard cushion (22) has retainers (20) to mate with pad retainers' (19) in the keyboard pad base (22).

Figure 24:
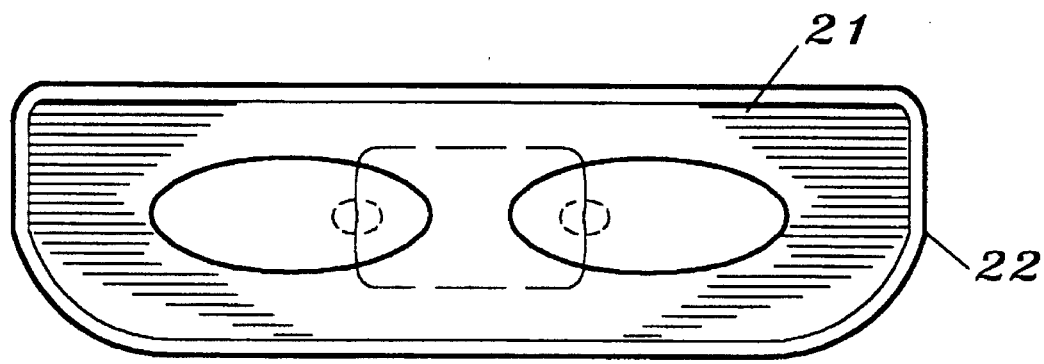
FIG. 24 illustrates a top view of a keyboard notebook pad.
Figure 25:
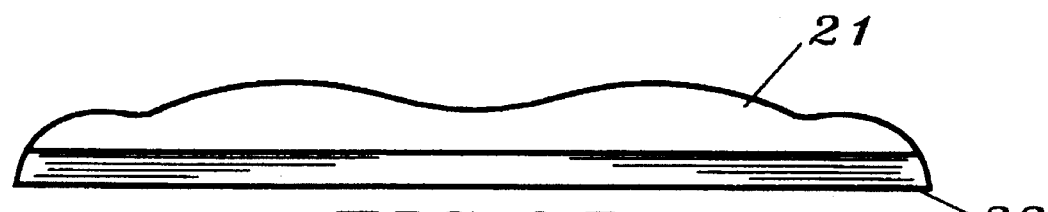
FIG. 25 illustrates a front view of a keyboard notebook pad.

A shorter version of a keyboard pad (23) with removable keyboard cushion (21) is illustrated in FIGS. 24 and 25 for use with shorter computer keyboards such as used with notebook type computers.

Referring to FIG. 26 there is a wrist pad (1) and keyboard pad (23) associated with a computer system with basic elements of a computer (25), display (26), keyboard (27) and mouse (28) with all interconnecting elements. The wrist pad (1) and keyboard pad (23) provide a means to rest the hand, arm, shoulder, neck elements and muscles by resting the wrists or hands on the pads when using the computer system. With the removable cushion feature a means to exercise by squeezing the cushions with the hands is provided. Also provided is a convenient receptacle aperture (17) for an exercise instruction card.

Figure 29:
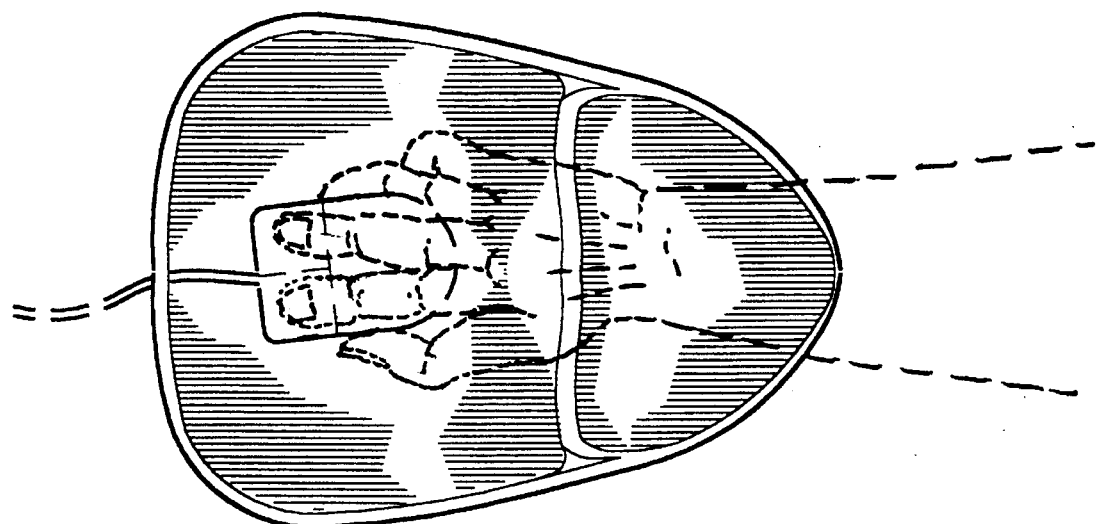
FIG. 29 illustrates a top view of the wrist and hand location when resting on the wrist pad pedestal.

FIGS. 27 through 29 illustrate the design of the wrist pad (1) such that the hand including the heel of the hand is free to move about to manipulate the mouse without having to lift the wrist. The hand is also at an elevated position relative to the surface (3) such that it is not necessary to bend the wrist upward at an awkward angle to use the mouse.

FIGS. 30 through 33 illustrate the design of the keyboard pad (23) such that the wrist rests on a convex curved surface at an elevated angle relative to the keyboard to allow actuation of the keys. This provides a pivot point and makes it unnecessary to bend the wrist upward at an awkward angle to use the keyboard. A further refinement is the concave indentation in the upper surface (35) between the highpoint (31) and the front side (36).

Figure 37:
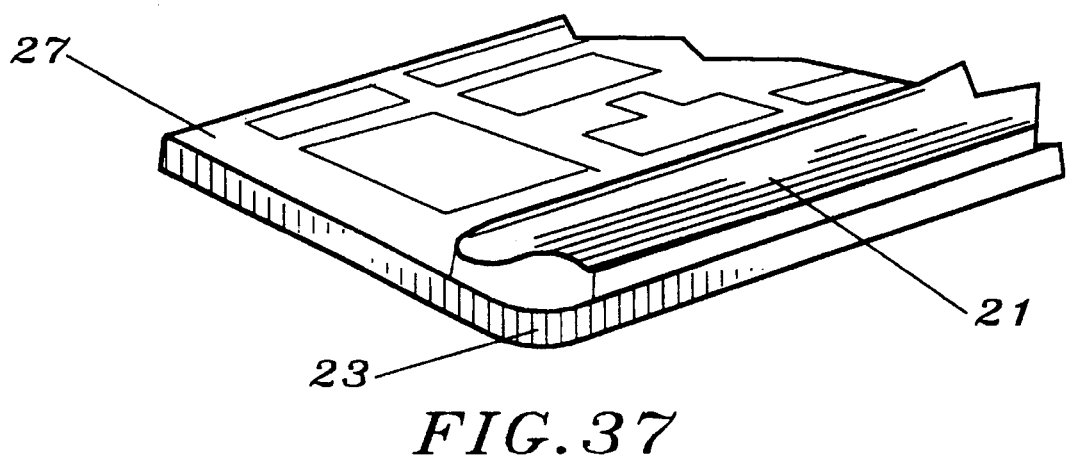
FIG. 37 illustrates a combine keyboard and keyboard pad.
Figure 19:
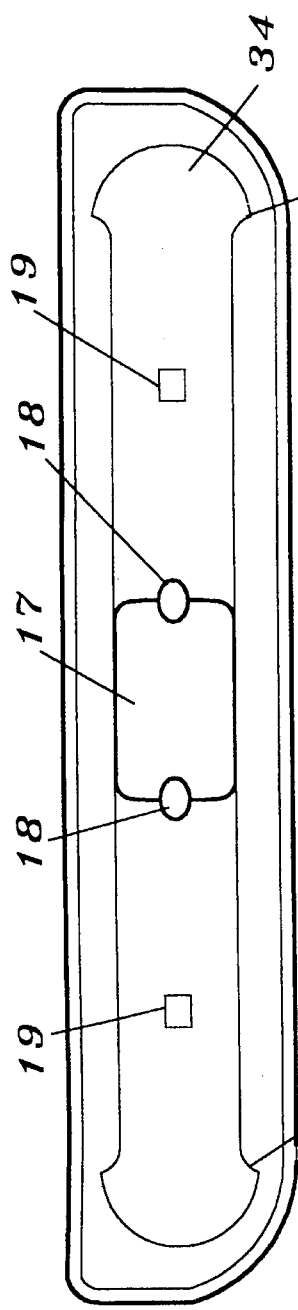
FIG. 19 illustrates a top view of the keyboard pad with the keyboard cushion removed.
Figure 20:
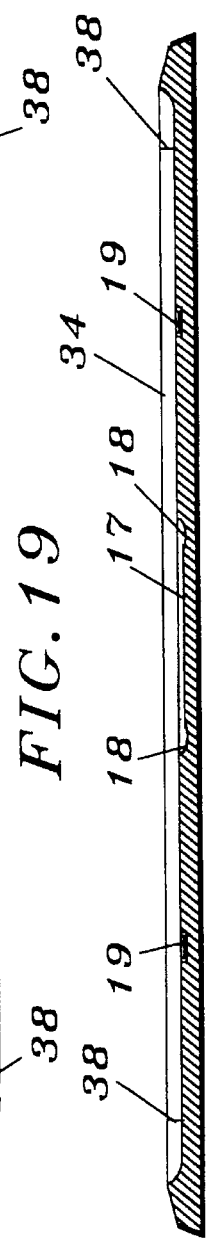
FIG. 20 illustrates a sectional view viewed from the front of the keyboard pad.
Figure 21:
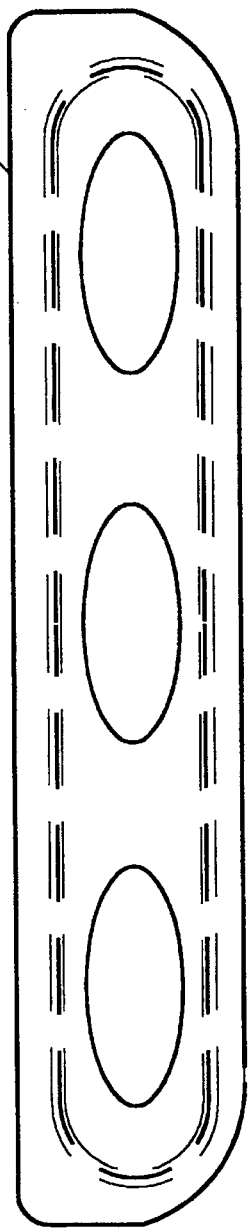
FIG. 21 illustrates a top view of the keyboard cushion removed from the keyboard pad.
Figure 22:
FIG. 22 illustrates a front view of the keyboard cushion removed from the keyboard pad.

FIG. 37 illustrates the design of a keyboard (27) with the keyboard pad (23) as One integral unit. The keyboard pad (23) has the same features as described except that the keyboard pad base (22) is formed as part of the keyboard (27).

I claim:

1. A device for mechanical manipulation of a computer mouse connected to a computer having a display comprising a pad and a pedestal wherein the pedestal is of a suitable height to provide ease of manipulation of a computer mouse; the pad is generally rectangular, is thicker along a center line than on a right edge and a left edge, and has a surface large enough to allow the computer mouse to control a cursor over the entire range of a computer display; and wherein the pedestal is curved in a downward sloping arch of a back, a right side, and a left side and the pedestal has a front which front is arched such that the front curves toward the back as the right side and the left side are approached from the center.

2. A device for mechanical manipulation of a computer mouse connected to a computer having a display comprising: a wrist pad base having a pedestal cushion recess aperture and a pad cushion recess aperture define therein, a pedestal cushion and a pad cushion wherein the pedestal cushion is of a suitable height to provide ease of manipulation of a computer mouse and the wrist pad is generally oblong with the pad cushion large enough to allow the compute mouse to control a cursor over the entire range of a computer display; wherein the pedestal cushion is curved in a downward sloping arch of a back, a right side and a left side and the pedestal cushion has a front which front is arched such that the front curves toward the pad cushion as the right side and the left side are approached from a center; and wherein the pedestal cushion has a pedestal cushion insert which pedestal cushion insert has a 2% slant and the pedestal cushion recess aperture has a 2% slant around an edge.

3. The device as in claim 2 a wherein the wrist pad base and pad cushion are one inch to one and one half inches thick at their thickest point.

4. A device for resting the arms and hands when using a computer keyboard entry device comprising a keyboard pad base having a keyboard cushion recess aperture and a receptacle aperture with a finger access defined therein and a keyboard cushion wherein the keyboard cushion has an upper surface which is convex shaped with a highpoint.

5. The device as in claim 4 wherein the keyboard cushion has a keyboard pad pedestal.

6. The device as in claim 4 wherein a highpoint is located 2.25 inches to 3.25 inches from a front side of the keyboard pad base.

7. The device as in claim 4 wherein a highpoint is located 2.25 inches to 3.25 inches from a front side of the keyboard pad base and the upper surface is concave shaped between the highpoint and the front side.

8. A device for mechanical manipulation of a computer mouse and a pointing/tracking device connected to a computer having a display comprising: a wrist pad base having a pedestal cushion recess aperture and a pad cushion recess aperture defined therein, a pedestal cushion and a pad cushion wherein the pedestal cushion is of a suitable height to provide ease of manipulation of a computer mouse and the wrist pad base is generally oblong with the pad cushion large enough to allow the computer mouse to control a cursor over the entire range of a computer display; the pedestal cushion is curved in a downward sloping arch of a back, a right side and a left side and the pedestal cushion has a front which front is arched such that the front curves toward the pad cushion as the right side and the left side are approached from a center; the pedestal cushion comprising of a hard squeezable, compressible material wherein the removal of the pedestal cushion from the wrist pad base allows the pedestal cushion use for preventive exercises; and the hand squeezable, compressible material has an indentation load deflection between 1.5 foot/pounds and 4.0 foot/pounds.

9. A device for resting the arms and hands when using a keyboard entry device comprising; a keyboard pad base having a keyboard cushion recess aperture defined therein and a keyboard cushion wherein the keyboard cushion has an upper surface which is convex shaped with highpoint; the keyboard cushion comprised of a hand squeezable, compressible material wherein the removal of the keyboard cushion from the keyboard pad base allows the keyboard cushion use for preventative exercise; and the hand squeezable, compressible material has an indentation load deflection between 1.5 foot/pounds and 4.0 foot/pounds.

10. The device as in claim 9 wherein the keyboard pad base is attached to a computer keyboard entry device.

11. A device for mechanical manipulation of a computer mouse connected to a computer having a display comprising: a wrist pad base having a pedestal cushion recess aperture and a pad cushion recess aperture defined therein, a pedestal cushion and a pad cushion wherein the pedestal cushion is of a suitable height to provide ease of manipulation of a computer mouse and the wrist pad is generally oblong with the pad cushion large enough to allow the computer mouse to control a cursor over the entire range of a computer display; wherein the pedestal cushion is curved in a downward sloping arch of a back, a right side and a left side and the pedestal cushion has a front which front is arched such that the front curves toward the pad cushion as the right side and the left side are approached from a center; and wherein the wrist pad base has a receptacle aperture defined therein and a finger access.

12. The device as in claim 11 wherein the wrist pad base and the pad cushion are one inch to one and one half inches thick at their thickest point.

13. A device for mechanical manipulation of a computer mouse and pointing/tracking device connected to a computer having a display comprising: a wrist pad base having a pedestal cushion recess aperture and a pad cushion recess aperture defined therein, a pedestal cushion and a pad cushion wherein the pedestal cushion is of a suitable height to provide ease of manipulation of a computer mouse and the wrist pad base is generally oblong with the pad cushion large enough to allow the computer mouse to control a cursor over the entire range of a computer display; the pedestal cushion is curved in a downward sloping arch of a back, a right side and a left side and the pedestal cushion has a front which front is arched such that the front curves toward the pad cushion as the right side and the left side are approached from a center; and the wrist pad base has a receptacle aperture defined therein with an exercise instruction card in the receptacle aperture and a finger access.

14. A device for resting the arms and hands when using a computer keyboard entry device comprising: a keyboard pad base having a keyboard cushion recess aperture defined therein and a keyboard cushion wherein the keyboard cushion has an upper surface which is convex shaped with a highpoint; and the keyboard pad base has a receptacle aperture defined therein with an exercise instruction card in the receptacle aperture and a finger access.

15. The device as in claim 14 wherein the keyboard pad base is attached to a computer keyboard entry device.

* * * * *